United States Patent
Kim et al.

(10) Patent No.: US 12,008,443 B2
(45) Date of Patent: Jun. 11, 2024

(54) METHOD AND APPARATUS WITH CIPHERTEXT TRAINING ANALYSIS MODEL

(71) Applicant: SAMSUNG SDS CO., LTD., Seoul (KR)

(72) Inventors: Eun Kyung Kim, Seoul (KR); Hyo Jin Yoon, Seoul (KR); Ji Hoon Cho, Seoul (KR); Min Jung Kim, Seoul (KR); Young Seon Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 882 days.

(21) Appl. No.: 17/081,519

(22) Filed: Oct. 27, 2020

(65) Prior Publication Data

US 2021/0326752 A1    Oct. 21, 2021

(30) Foreign Application Priority Data

Apr. 21, 2020    (KR) .................. 10-2020-0048335

(51) Int. Cl.
*G06N 20/00* (2019.01)
*H04L 9/00* (2022.01)
*H04L 9/06* (2006.01)

(52) U.S. Cl.
CPC ............. *G06N 20/00* (2019.01); *H04L 9/008* (2013.01); *H04L 9/0618* (2013.01)

(58) Field of Classification Search
None
See application file for complete search history.

(56) References Cited

U.S. PATENT DOCUMENTS

| | | |
|---|---|---|
| 6,282,529 B1 | 8/2001 | Neuneier et al. |
| 2020/0019867 A1 | 1/2020 | Nandakumar et al. |

FOREIGN PATENT DOCUMENTS

| | | |
|---|---|---|
| EP | 3 203 679 A1 | 8/2017 |
| KR | 10-2019-0115323 A | 10/2019 |

OTHER PUBLICATIONS

Vizitiu et al., Applying Deep Neural Networks over Homomorphic Encrypted Medical Data, Computational and Mathematical Methods in Medicine vol. 2020, Article ID 3910250; Published Apr. 9, 2020; Total Pages: 26 pages; https://doi.org/10.1155/2020/3910250 (Year: 2020).*

Hesamifard et al., Privacy-preserving Machine Learning as a Service, Proceedings on Privacy Enhancing Technologies ; 2018 (3); pp. 123-142 (Year: 2018).*

Xie et al., Efficient Integer Vector Homomorphic Encryption Using Deep Learning for Neural Networks, ICONIP 2018, LNCS 11301, pp. 83-95, 2018; https://doi.org/10.1007/978-3-030-04167-0_8 (Year: 2018).*

(Continued)

*Primary Examiner* — Alan Chen
(74) *Attorney, Agent, or Firm* — NSIP Law

(57) ABSTRACT

A method for training an analysis model according to an embodiment includes receiving synthetic data for original data from a client apparatus, determining a hyperparameter value for analysis model training using the synthetic data, receiving a ciphertext for the original data from the client apparatus, and training the analysis model using the determined hyperparameter value and the received cipher text.

15 Claims, 4 Drawing Sheets

(56) References Cited

OTHER PUBLICATIONS

European Office Action issued on May 22, 2023, in counterpart European Patent Application No. 20 204 925.0 (6 pages in English).
European Search Report For EP20204925.0 issued on Mar. 31, 2021 from European patent office in a counterpart European patent application.
Brendan McMahan H et al., "A General Approach to Adding Differential Privacy to Iterative Training Procedures", arxiv.org, Cornell Univerisy Library, 2010LIN Library Cornell University Ithaca, NY 14853, 2018.

* cited by examiner

METHOD AND APPARATUS WITH CIPHERTEXT TRAINING ANALYSIS MODEL

CROSS-REFERENCE TO RELATED APPLICATION

This application claims the benefit under 35 USC § 119(a) of Korean Patent Application No. 10-2020-0048335, filed on Apr. 21, 2020, in the Korean Intellectual Property Office, the entire disclosure of which is incorporated herein by reference for all purposes.

BACKGROUND

1. Field

The disclosed embodiments relate to machine learning technology.

2. Description of Related Art

Analysis model training using machine learning is performed in such a way that the progress of model training is made according to each hyperparameter value using data refined through data preprocessing and then, a resulting model is evaluated, and if accuracy is low, the training is iterated again by changing a data preprocessing scheme or hyperparameter value. Therefore, accuracy of a model to be trained greatly depends on a data preparation scheme and hyperparameter value.

Meanwhile, attempts to prevent exposure of sensitive information included in data used for training are continuing by performing an analysis model training process in an encrypted state using homomorphic encryption technology. However, in a case of performing training using homogeneous encryption technology, since the difference in training performance time varies from several tens of times to several thousands of times compared to a case of not using the homogeneous encryption technology, it takes a lot of time and cost to iteratively perform training to find an optimal data preprocessing scheme and the hyperparameter value. Meanwhile, in order to reduce such time and cost, training may be performed using a limited data preprocessing scheme and hyperparameter value, but in this case, it is difficult to guarantee the accuracy of the trained model.

SUMMARY

The disclosed embodiments are intended to provide a method and apparatus for training an analysis model.

A method for training an analysis model according to an embodiment including receiving synthetic data for original data from a client apparatus, determining a hyperparameter value for analysis model training using the synthetic data, receiving a ciphertext for the original data from the client apparatus, and training the analysis model using the determined hyperparameter value and the received cipher text.

The method may further include determining a data preprocessing scheme to be applied to the original data for the analysis model training using the synthetic data and notifying the determined data preprocessing scheme to the client apparatus and, wherein the receiving of the ciphertext may include receiving a ciphertext for data generated by preprocessing the original data according to the determined data preprocessing scheme.

The synthetic data may satisfy local differential privacy.

The ciphertext may be a ciphertext encrypted using a homomorphic encryption algorithm.

The training of the analysis model may include training the analysis model by using the received ciphertext in an encrypted state.

An apparatus for training an analysis model according to an embodiment including a determination unit configured to receive synthetic data for original data from a client apparatus and determine a hyperparameter value for analysis model training using the synthetic data and a model training unit configured to receive a ciphertext for the original data from the client apparatus, and train the analysis model using the determined hyperparameter value and the received ciphertext.

The determination unit may be further configured to determine a data preprocessing scheme to be applied to the original data for the analysis model training using the synthetic data and notify the determined data preprocessing scheme to the client apparatus, and the model training unit may be further configured to receive a ciphertext for data generated by preprocessing the original data according to the determined data preprocessing scheme.

The synthetic data may satisfy local differential privacy.

The ciphertext may be a ciphertext encrypted using a homomorphic encryption algorithm.

The model training unit may be further configured to train the analysis model by using the received ciphertext in an encrypted state.

DETAILED DESCRIPTION

Hereinafter, specific embodiments of the present invention will be described with reference to the accompanying drawings. The following detailed description is provided to aid in a comprehensive understanding of a method, an apparatus and/or a system described in the present specification. However, the detailed description is only for illustrative purpose and the present invention is not limited thereto.

In describing the embodiments of the present invention, when it is determined that a detailed description of known technology related to the present invention may unnecessarily obscure the gist of the present invention, the detailed description thereof will be omitted. In addition, terms to be described later are terms defined in consideration of functions in the present invention, which may vary depending on intention or custom of a user or operator. Therefore, the definition of these terms should be made based on the contents throughout this specification. The terms used in the detailed description are only for describing the embodiments of the present invention and should not be used in a limiting sense. Unless expressly used otherwise, a singular form includes a plural form. In this description, expressions such as "including" or "comprising" are intended to indicate any property, number, step, element, and some or combinations thereof, and such expressions should not be interpreted to exclude the presence or possibility of one or more other properties, numbers, steps, elements other than those described, and some or combinations thereof.

Figure 1:
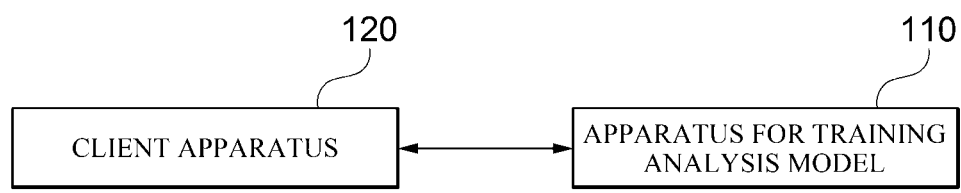
FIG. 1 is a configuration diagram of an analysis system according to an embodiment.

FIG. 1 is a block diagram of an analysis system according to an embodiment.

Referring to FIG. 1, an analysis service system 100 according to an embodiment includes an apparatus 110 for training an analysis model and a client apparatus 120.

The apparatus 100 for training the analysis model is an apparatus for training the analysis model through machine learning and generating and providing a data analysis result using the trained analysis model.

According to an embodiment, the analysis model may be, for example, a model that is trained to perform predictive analysis, statistical analysis, classification, clustering, etc. on input data, but in addition to the example described above, may be various types of models that are trained to generate, detect, or extract meaningful new information based on input data.

Meanwhile, according to an embodiment, the analysis model may be a model based on an artificial neural network, but is not necessarily limited to a specific type and form as long as the analysis model is a model that can be trained through machine learning.

The client apparatus 120 is an apparatus that owns original data to be used as training data for analysis model training. In this case, the fact that the client apparatus 120 owns the original data may refer to the fact that the client apparatus 120 stores the original data in storage means provided therein, or can acquire the original data by accessing an external apparatus that stores the original data.

Meanwhile, the original data may be data that contains sensitive information that is prohibited from disclosure to third parties that are not permitted by law, or that is required to be confidential due to personal privacy protection or security needs, for example, genetic data, medical record data, financial transaction information data (e.g., account number, account deposit and withdrawal details, etc.) and personal information data (e.g., name, social security number, etc.), etc.

As a specific example, when the analysis model is a model that is trained to predict the likelihood of a specific disease based on patient's genetic data or medical treatment data, the original data may be pre-collected patient' genetic data and medical record data, etc. However, the type and form of the original data are not necessarily limited to the examples described above, and may differ depending on the purpose of analysis using the analysis model and the type of the analysis model, etc.

Meanwhile, in the example illustrated in FIG. 1, it is illustrated that there is one client apparatus 120, but two or more client apparatuses 120 may be included in the analysis service system 100 according to an embodiment.

Figure 2:
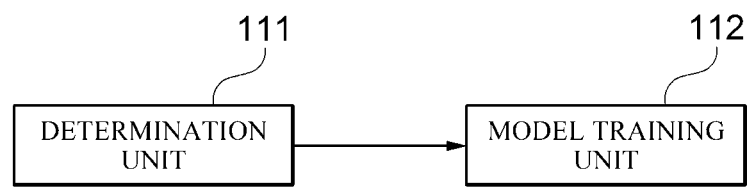
FIG. 2 is a block diagram of an apparatus for training an analysis model according to an embodiment.

FIG. 2 is a configuration diagram of an apparatus for training an analysis model according to an embodiment.

Referring to FIG. 2, the apparatus 110 for training the analysis model according to an embodiment includes a determination unit 111 and a model training unit 112.

In an embodiment, the determination unit 111 and the model training unit 112 may be implemented by one or more processors or a combination of one or more processors and software, and unlike the illustrated example, may not be clearly distinguished in a specific operation.

The determination unit 111 receives synthetic data for the original data from the client apparatus 120, and determines a hyperparameter value for training an analysis model using the received synthetic data.

According to an embodiment, the synthetic data for the original data has statistical characteristics that are the same as or similar to the original data, and may be data created to satisfy local differential privacy. In this case, a method of creating synthetic data is not necessarily limited to a specific method, and the synthetic data may be created using various known methods.

Meanwhile, the hyperparameter refers to, for example, a parameter whose value must be determined in advance for analysis model training, such as a learning rate, batch size, and the number of neurons in each layer included in an artificial neural network, and the type of hyperparameter may differ according to the type and shape of the analysis model.

According to an embodiment, the determination unit 111 may determine the hyperparameter value capable of deriving an optimal learning result by iteratively performing analysis model training using the synthetic data while changing the hyperparameter value within a preset range. However, the method for determining the hyperparameter value is not necessarily limited to a specific method, and various well-known hyperparameter optimization techniques may be used.

Meanwhile, according to an embodiment, the determination unit 111 may determine a data preprocessing scheme to be applied to the original data by using the synthetic data for the original data, and notify the determined data preprocessing scheme to the client apparatus 120.

In this case, data preprocessing refers to a series of processes for processing the original data into a form suitable for analysis model training, and includes at least one of, for example, data purification, data integration, data reduction, data transformation, and data rearrangement.

Specifically, according to an embodiment, the determination unit 111 may determine a data preprocessing scheme capable of deriving an optimal training result among a plurality of preset data preprocessing schemes as a data preprocessing scheme to be applied to the original data by iteratively performing analysis model training using the preprocessed synthetic data while changing the data preprocessing scheme for the synthetic data.

The model training unit 112 receives the ciphertext for the original data from the client apparatus 120 and trains the analysis model using the received ciphertext and the hyperparameter value determined by the determination unit 111.

According to an embodiment, the ciphertext received from the client apparatus 120 may be a ciphertext acquired by encrypting the original data using a homomorphic encryption algorithm, and the model training unit 112 may train the analysis model by using the received ciphertext in an encrypted state.

In this case, the homomorphic encryption algorithm refers to an encryption algorithm that enables a ciphertext for plaintext data to be computed in an encrypted state to create an encrypted computation result for the plaintext data.

Meanwhile, the homomorphic encryption algorithm used to create the ciphertext for the original data is not necessarily limited to a specific algorithm, and various well-known homomorphic encryption algorithms may be used according to the type of computation to be performed on the original data for the analysis model training.

Meanwhile, according to an embodiment, the ciphertext for the original data received from the client apparatus 120 may be a ciphertext for data created by preprocessing the original data according to the data preprocessing scheme determined by the determination unit 111.

Specifically, when the client apparatus 120 is notified of the data preprocessing scheme for the original data from the determination unit 111, the client apparatus 120 may preprocess the original data according to the notified data preprocessing scheme, and then encrypt the preprocessed data and provide the encrypted preprocessed data to the model training unit 112.

Figure 3:
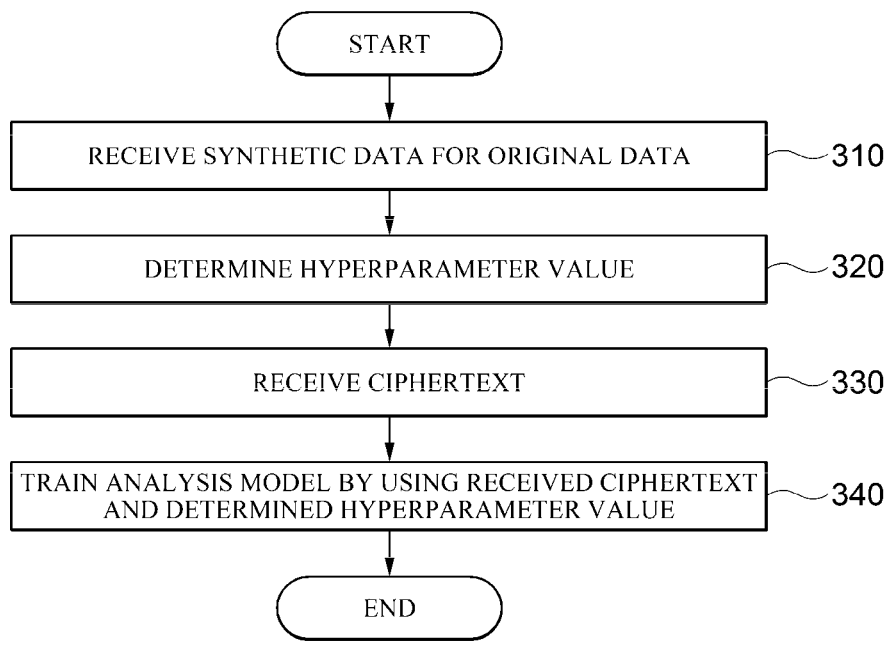
FIG. 3 is a flowchart of a method for training an analysis model according to an embodiment.

FIG. 3 is a flowchart of a method for training an analysis model according to an embodiment.

The method illustrated in FIG. 3 may be performed by the apparatus 110 for training the analysis model.

Referring to FIG. 3, first, the apparatus 110 for training the analysis model receives synthetic data for original data from the client apparatus 120 (310).

In this case, the synthetic data may have the same or similar statistical characteristics as the original data and may be data created to satisfy local differential privacy.

Thereafter, the apparatus 100 for training the analysis model determines a hyperparameter value for analysis model training using the received synthetic data (320).

Thereafter, the apparatus 100 for training the analysis model receives the ciphertext for the original data from the client apparatus 120 (330).

In this case, the ciphertext for the original data may be a ciphertext acquired by encrypting the original data using a homogeneous encryption algorithm.

Thereafter, the apparatus 100 for training the analysis model trains the analysis model by using the received ciphertext and the determined hyperparameter value (340).

In this case, the apparatus 100 for training the analysis model may train the analysis model by using the received ciphertext in an encrypted state.

Meanwhile, in the flowchart illustrated in FIG. 3, at least some of the steps may be performed in a different order, performed by being combined with other steps, performed together, omitted, performed by being divided into detailed steps, or performed by being added with one or more steps not illustrated.

Figure 4:
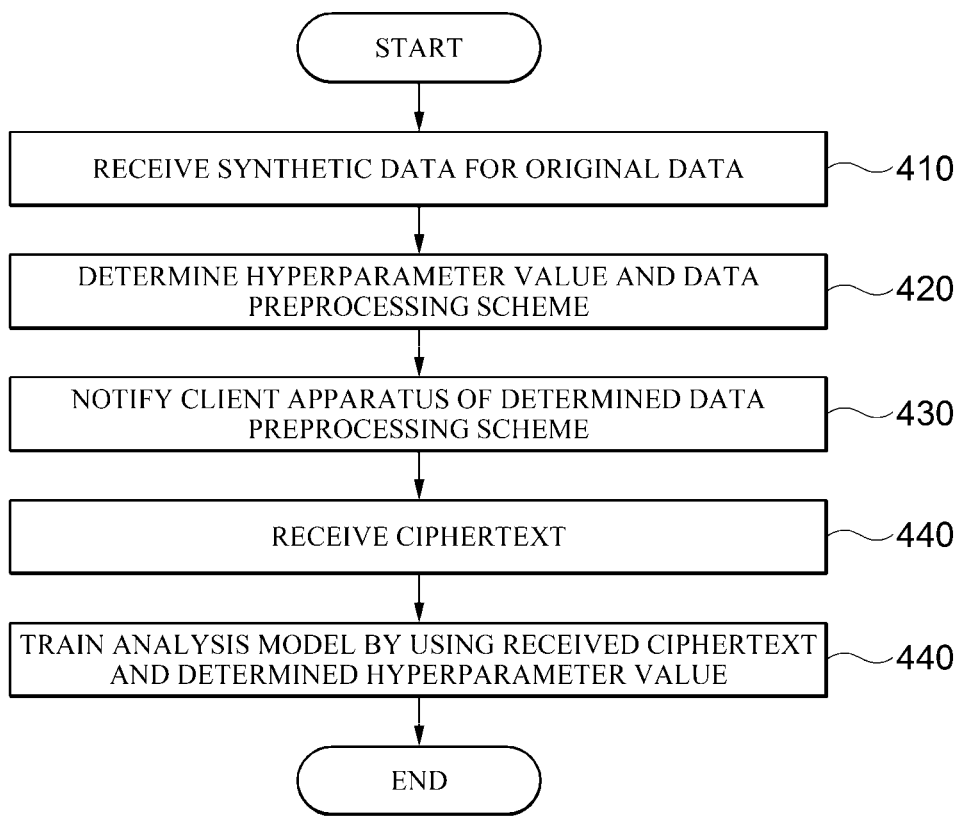
FIG. 4 is a flowchart of a method for training an analysis model according to another embodiment.

FIG. 4 is a flowchart of a method for training an analysis model according to another embodiment.

The method illustrated in FIG. 4 may be performed by the apparatus 100 for training the analysis model.

Referring to FIG. 4, the apparatus 100 for training the analysis model receives synthetic data for original data from the client apparatus 120 (410).

In this case, the synthetic data may have the same or similar statistical characteristics as the original data and may be data created to satisfy local differential privacy.

Thereafter, the apparatus 100 for training the analysis model determines a hyperparameter value for the analysis model training and a data preprocessing scheme for the original data using the received synthetic data (420).

Thereafter, the apparatus 100 for training the analysis model notifies the client apparatus 120 of the determined data preprocessing scheme (430).

Thereafter, the apparatus 100 for training the analysis model pre-processes the original data according to the data preprocessing scheme determined from the client apparatus 120 and receives a ciphertext for the created data (440).

In this case, the received ciphertext may be a ciphertext acquired by encrypting the data created by preprocessing the original data using a homogeneous encryption algorithm.

Thereafter, the apparatus 100 for training the analysis model trains the analysis model by using the received ciphertext and the determined hyperparameter value (450).

In this case, the apparatus 100 for training the analysis model may train the analysis model by using the received ciphertext in an encrypted state.

Meanwhile, at least some of the steps in the flowchart illustrated in FIG. 4 are performed in a different order, performed by being combined with other steps, performed together, omitted, performed by being divided into detailed steps, or performed by being added with one or more steps not illustrated.

Figure 5:
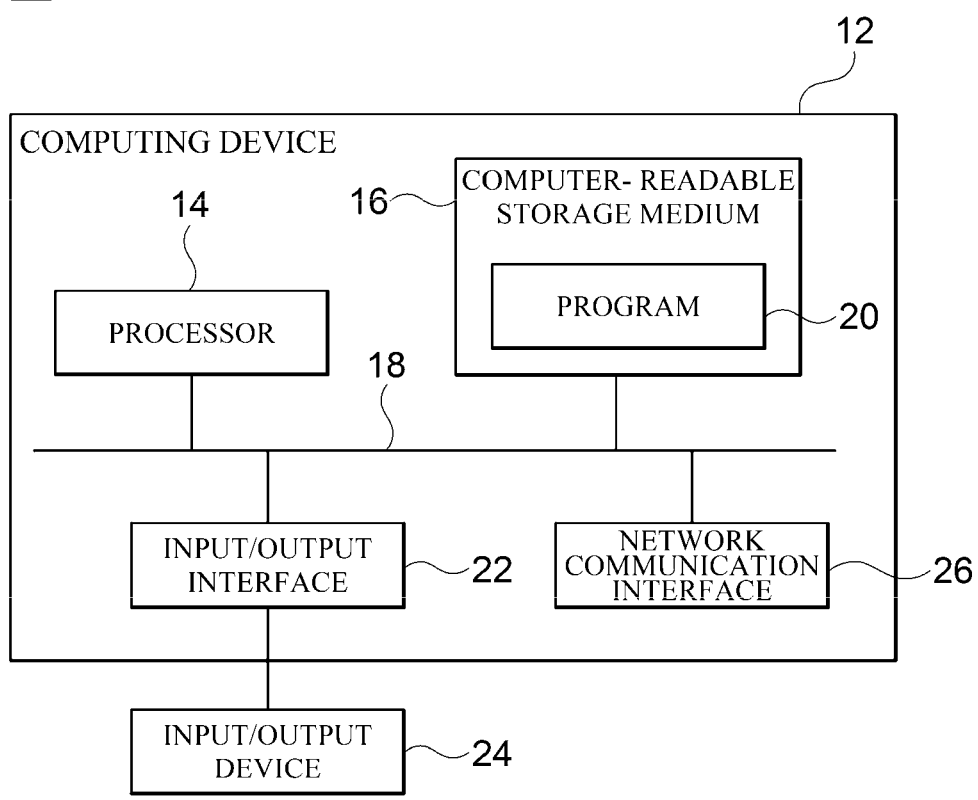
FIG. 5 is a block diagram for illustratively describing a computing environment including a computing device according to an embodiment.

FIG. 5 is a block diagram for illustratively describing a computing environment that includes a computing device according to an embodiment. In the embodiment illustrated in FIG. 5, each component may have different functions and capabilities in addition to those described below, and additional components may be included in addition to those described below.

The illustrated computing environment 10 includes a computing device 12. In an embodiment, the computing device 12 may be one or more components included in the apparatus 110 for training the analysis model illustrated in FIG. 2. The computing device 12 includes at least one processor 14, a computer-readable storage medium 16, and a communication bus 18. The processor 14 may cause the computing device 12 to perform steps according to the exemplary embodiment described above. For example, the processor 14 may execute one or more programs stored on the computer-readable storage medium 16. The one or more programs may include one or more computer-executable instructions, which, when executed by the processor 14, may be configured to cause the computing device 12 to perform steps according to the exemplary embodiment.

The computer-readable storage medium 16 is configured to store the computer-executable instruction or program code, program data, and/or other suitable forms of information. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash Memory devices, other types of storage media that are accessible by the computing device 12 and store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a voice or sound input device, input devices such as various types of sensor devices and/or photographing devices, and/or output devices such as a display device, a printer, a speaker, and/or a network card. The exemplary input/output device 24 may be included inside the computing device 12 as a component constituting the computing device 12, or may be connected to the computing device 12 as a separate device distinct from the computing device 12.

According to the disclosed embodiments, after determining the hyperparameter value for analysis model training, by training the analysis model using the synthetic data for the original data to be used for the analysis model training, it is possible to prevent exposure of sensitive information included in the original data and improve the accuracy and efficiency of the analysis model training.

Although the present invention has been described in detail through representative examples as above, those skilled in the art to which the present invention pertains will understand that various modifications may be made thereto within the limit that do not depart from the scope of the present invention. Therefore, the scope of rights of the present invention should not be limited to the described embodiments, but should be defined not only by claims set forth below but also by equivalents of the claims.

What is claimed is:

1. A processor-implemented method for training an analysis model, the method comprising:
   receiving synthetic data for original data from a client apparatus;
   determining a data preprocessing scheme to be applied to the original data for analysis model training using the synthetic data;
   determining a hyperparameter value for training analysis model using the synthetic data;
   receiving a ciphertext for the original data from the client apparatus; and
   training the analysis model using the determined hyperparameter value and the received ciphertext.

2. The method of claim 1, further comprising:
   notifying the determined data preprocessing scheme to the client apparatus,
   wherein the receiving of the ciphertext comprises receiving a ciphertext for data generated by preprocessing the original data according to the determined data preprocessing scheme.

3. The method of claim 1, wherein the synthetic data satisfies local differential privacy.

4. The method of claim 1, wherein the ciphertext is a ciphertext encrypted using a homomorphic encryption algorithm.

5. The method of claim 4, wherein the training of the analysis model comprises training the analysis model by using the received ciphertext in an encrypted state.

6. An apparatus for training an analysis model, comprising:
   one or more processors configured to execute instructions; and
   a memory storing the instructions, wherein execution of the instructions configures the processors to:
      receive synthetic data for original data from a client apparatus;
      determine, based on the synthetic data, a data preprocessing scheme to be applied to the original data for analysis model training;
      determine a hyperparameter value using the synthetic data;
      receive a ciphertext for the original data from the client apparatus; and
      train the analysis model using the determined hyperparameter value and the received ciphertext.

7. The apparatus of claim 6, wherein the receiving the synthetic data further comprises
   notifying the determined data preprocessing scheme to the client apparatus, and
   wherein the receiving the ciphertext further comprises receiving a ciphertext for data generated by preprocessing the original data according to the determined data preprocessing scheme.

8. The apparatus of claim 6, wherein the synthetic data satisfies local differential privacy.

9. The apparatus of claim 6, wherein the ciphertext is a ciphertext encrypted using a homomorphic encryption algorithm.

10. The apparatus of claim 9, wherein the receiving the ciphertext further comprises training the analysis model by using the received ciphertext in an encrypted state.

11. A method performed by a computing device in communication with a client device, the method comprising:
    receiving, from the client device, synthetic data having a same statistical characteristic as original data stored on the client device;
    based on receiving the synthetic data, determining a hyperparameter value of a neural network model that optimizes training of the neural network model;
    receiving from the client device a ciphertext generated by encryption of the original data;
    configuring the neural network model according to the hyperparameter value and training the neural network model based on the ciphertext.

12. The method of claim 11, further comprising:
    based on the received synthetic data, selecting, from among a set of predefined preprocessing schemes, a preprocessing scheme determined to be optimal for training the neural network model.

13. The method of claim 12, further comprising:
    sending an indication of the selected preprocessing scheme to the client device, and wherein
    based on the indication, the client device uses the preprocessing scheme to generate the ciphertext before sending the ciphertext to the computing device.

14. The method of claim 12, wherein the determining the hyperparameter value comprises iteratively training the neural network model based on the synthetic data.

15. The method of claim 12, wherein the preprocessing scheme is selected by performing training of the neural network model based on the synthetic data.

* * * * *